United States Patent
Power et al.

(10) Patent No.: US 6,626,454 B1
(45) Date of Patent: Sep. 30, 2003

(54) TRAILER SUSPENSION

(75) Inventors: Michael Andrew Power, Montgomery, AL (US); Don H. Sitter, Grass Lake, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/596,413

(22) Filed: Jun. 19, 2000

(51) Int. Cl.[7] .................................................. B60G 5/00
(52) U.S. Cl. ................ 280/683; 280/678; 280/124.116; 280/124.157
(58) Field of Search ................................. 280/678, 683, 280/124.116, 124.157; 267/256

(56) References Cited

U.S. PATENT DOCUMENTS

| | | | |
|---|---|---|---|
| 2,226,047 A | 12/1940 | Borgward | 180/73 |
| 3,573,882 A | 4/1971 | Van Winsen et al. | 280/124 |
| 3,952,824 A | 4/1976 | Matschinsky | 180/73 |
| 4,087,117 A * | 5/1978 | Brace et al. | 280/724 |
| 4,271,922 A | 6/1981 | Kishline | 180/254 |
| 4,371,189 A * | 2/1983 | Raidel | 280/682 |
| 4,589,677 A * | 5/1986 | Matschinsky | 180/905 |
| 4,615,539 A * | 10/1986 | Pierce | 280/690 |
| 4,802,689 A | 2/1989 | Hoffmann et al. | 280/688 |
| 5,112,078 A * | 5/1992 | Galazin et al. | 280/711 |
| 5,366,237 A | 11/1994 | Dilling et al. | 280/711 |
| 5,401,049 A | 3/1995 | Richardson | 280/663 |
| 5,458,359 A * | 10/1995 | Brandt | 280/673 |
| 5,566,969 A | 10/1996 | Tattermusch | 280/688 |
| 5,649,719 A | 7/1997 | Wallace et al. | 280/713 |
| 5,901,972 A | 5/1999 | Watanabe et al. | 280/124.152 |
| 6,035,788 A | 3/2000 | Mau et al. | 105/218.1 |

OTHER PUBLICATIONS

"IPAC Air Ride Axle Series" Brochure, Front and Back.
"Tires, Suspension and Handling" John C. Dixon ($2^{nd}$ edition) 1996, cover, inside cover pages, pps. 187–188, 199–202.
"Neweld The Air Ride Suspension Industry's First Completely Non–Welded Axle Connection" Brochure, Front and Back.

* cited by examiner

*Primary Examiner*—Lesley D. Morris
*Assistant Examiner*—Paul Royal, Jr.
(74) *Attorney, Agent, or Firm*—Dykema Gossett PLLC

(57) ABSTRACT

A suspension system for supporting a trailer frame on a trailer axle is provided. The suspension system includes a connector disposed about the trailer axle and upper and lower arms. The upper and lower arms are each coupled to the frame and to the connector. The upper arm is coupled to the connector at a point between the axle and the longitudinal rails of the frame. The lower arm is coupled to the connector at a point between the axle and ground. The upper and lower arms together form a Watt's linkage that minimizes and/or eliminates movement of the axle in the direction of vehicle travel.

23 Claims, 4 Drawing Sheets

TRAILER SUSPENSION

BACKGROUND OF THE INVENTION

1. Field of the Invention

This invention relates to suspension systems for trailers and, in particular, to a suspension system that incorporates a Watt's linkage to restrict movement of the trailer axles in a fore-aft direction (i.e., in the direction of vehicle travel perpendicular to the longitudinal axis of the trailer axles).

2. Disclosure of Related Art

In a conventional leading or trailing arm trailer suspension system, a leading or trailing arm, respectively, extends from the trailer frame for connection with the trailer axle. The arm is pivotally connected at one end to the trailer frame and is connected at a second end to the trailer axle. The arm may extend over or under the trailer axle and may support and air spring thereon.

The conventional trailer suspension systems described above have suffered from a significant drawback. These suspension systems are subject to a relatively high degree of movement in the fore-aft direction (i.e., in the direction of vehicle travel perpendicular to the longitudinal axis of the trailer axles). As a result, the welded connections on the trailer axles are weakened and often fail. Further, the stress placed on the welded connections often extends to the axle itself, resulting in a weakening or failure of the axle.

Conventional trailer suspension systems also suffer from another drawback. The leading or trailing arm is generally connected to the axle using a bracket, clamp or other axle connector. This connector must be secured to the axle to prevent movement of the connector relative to the trailer axle. In conventional systems, the connector is secured to the axle by welding the connector to the axle or by using an adhesive. Each of these methods is disadvantageous because each method requires a relatively large amount of assembly time and may result in a weakening of the axle.

There is thus a need for an improved suspension system that will minimize or eliminate one or more of the above-mentioned deficiencies.

SUMMARY OF THE INVENTION

The present invention provides a suspension system for supporting a trailer frame on a trailer axle.

A suspension system in accordance with the present invention includes a connector disposed about a trailer axle. The connector may include first and second members disposed about first and second portions of the trailer axle and one or more fasteners that couple the first and second members together. The suspension system also includes an upper arm that is coupled to the frame and to the connector at a point between the frame and the trailer axle. Finally, the suspension system includes a lower arm that is coupled to the frame and to the connector at a point between the trailer axle and the ground. The positional relationship of the upper and lower arms may be described with reference to a pair of planes intersecting the longitudinal axis of the trailer axle. The first plane is parallel to the direction of vehicle travel and to the longitudinal rails of the trailer frame and the second plane is perpendicular to the longitudinal rails of the trailer frame. The upper arm is coupled to the connector on a first side of the first plane ("above" the axis of the trailer axle relative to ground) and to the trailer frame on a first side of the second plane. The lower arm is coupled to the connector on a second side of the first plane ("below" the axis of the trailer axle relative to ground) and to the trailer frame on a second side of the second plane. The upper and lower arms together form a Watt's linkage that minimizes and/or eliminates movement in the fore-aft direction (i.e., in the direction of vehicle travel perpendicular to longitudinal axis of the trailer axle) while allowing vertical displacement of the trailer axle.

A suspension system in accordance with the present invention represents a significant improvement over the prior art. The use of a Watt's linkage minimizes and/or eliminates movement in the fore-aft direction. As a result, the stress on welded connections along the trailer axles is significantly reduced as well as the stress on the axle itself thereby increasing the life of the axle and suspension system and reducing maintenance and repair costs. The construction of the connector of the inventive suspension system also represents a significant improvement over the prior art. In particular, the connector requires less assembly time than conventional connectors and minimizes the potential for damage to the axle.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
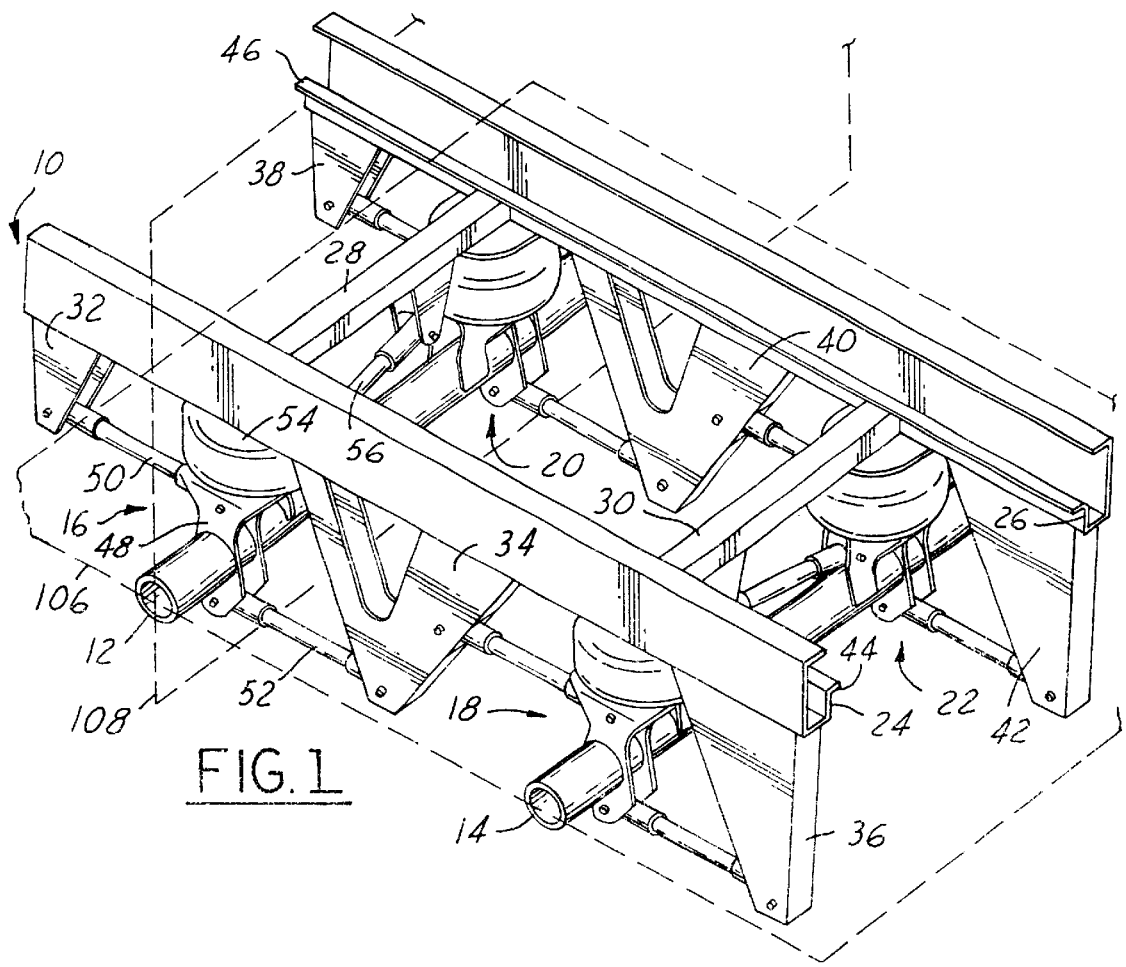
FIG. 1 is a perspective view of a trailer frame supported on a pair of trailer axles by a plurality of suspension systems in accordance with a first embodiment of the present invention.
Figure 2:
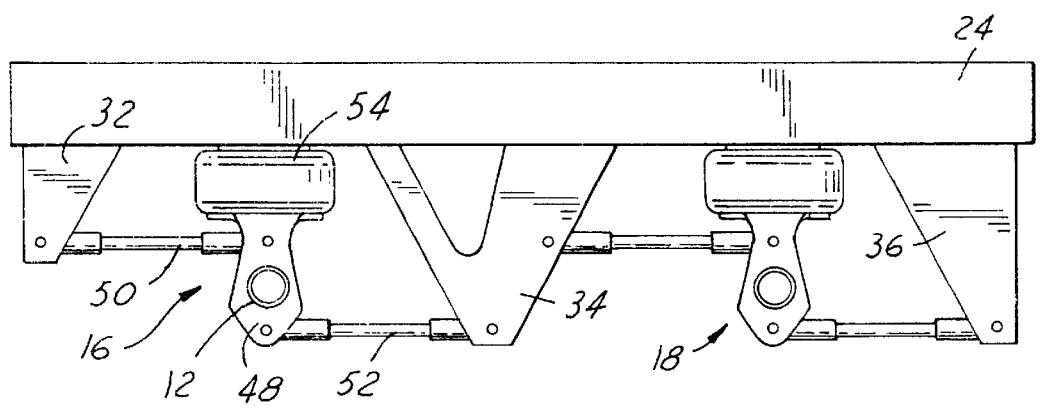
FIG. 2 is a side view of the trailer frame and suspension systems of FIG. 1.
Figure 3:
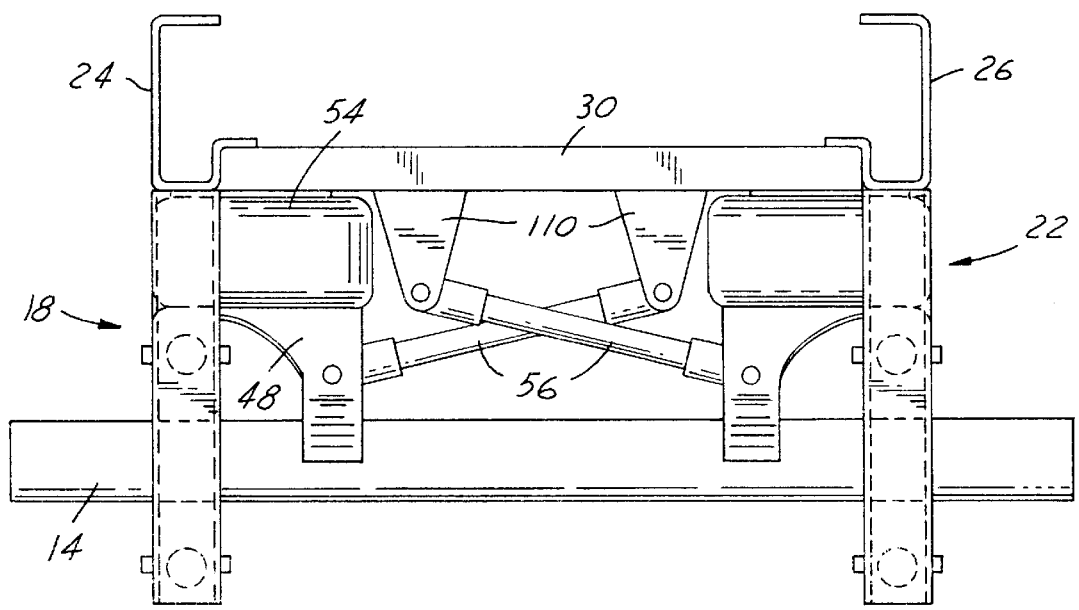
FIG. 3 is a front view of the trailer frame and suspension systems of FIG. 1.

Referring now to the drawings wherein like reference numerals are used to identify identical components in the various views, FIGS. 1–3 illustrate a trailer frame 10 supported on a pair of trailer axles 12, 14 by a plurality of suspension systems 16, 18, 20, 22 in accordance with the present invention. The illustrated frame, 10, axles 12, 14, and suspension systems 16, 18, 20, 22 are used to support a conventional trailer (not shown).

Frame 10 is provided to support a conventional trailer on axles 12, 14. Frame 10 is conventional in the art and may be made from conventional metals and metal alloys. Frame 10 includes a pair of longitudinal rails 24, 26 extending in the direction of vehicle travel and in the longitudinal direction of the trailer (not shown) and a pair of cross-members 28, 30. Frame 10 may also include a plurality of hangers 32, 34, 36, 38, 40, 42 descending from rails 24, 26.

Rails 24, 26 are provided to secure and align a trailer (not shown) on frame 10 and are conventional in the art. Rails 24, 26 are generally C-shaped in cross-section, with a flange 44, 46 extending transverse to the longitudinal direction of each of rails 24, 26.

Cross-members 28, 30 are provided to connect rails 24, 26 and are conventional in the art. Cross-members 28, 30 may also provide a means for mounting components of suspension systems 16, 18, 20, 22 and may provide a bearing surface for the springs of suspension systems 16, 18, 20, 22.

Hangers 32, 34, 36, 38, 40, 42 are provided to mount components of suspension systems 16, 18, 20, 22 to frame 10. Hangers 32, 34, 36, 38, 40, 42 are conventional in the art and it will be understood by those in the art that the number, shape, composition, and configuration of hangers 32, 34, 36, 38, 40, 42 may vary depending upon the design of suspension systems 16, 18, 20, 22 and other design requirements.

Axles 12, 14 are provided to rotatably support wheels (not shown) of the trailer, braking systems (not shown), and other components. Axles 12, 14 are conventional in the art and may be forged or formed from a variety of conventional metals and metal alloys. Although axles 12, 14, are circular in cross-section in the illustrated embodiment, it will be understood by those of skill in the art that the shape and other design characteristics of axles 12, 14 may vary depending upon a variety of design requirements. Further, although only two axles 12, 14 are shown in the Figures, it should be understood that the inventive suspension system may be used in trailers having any number of axles.

Suspension systems 16, 18, 20, 22 are provided to support frame 10 on axles 12, 14. In accordance with the present invention, each suspension system 16, 18, 20, 22 may include a connector 48, an upper arm 50, and a lower arm 52 for purposes to be described hereinbelow. Each of systems 16, 18, 20, 22 may also include an air spring 54. Finally, one or more of systems 16, 18, 20, 22 may include a panhard rod 56.

Connector 48 is provided to couple upper and lower arms 50, 52, respectively, to one of axles 12, 14. Connector 48 may also provide a spring seat for spring 54 and may receive one end of panhard rod 56. A variety of connectors are known in the art and it will be understood by those of ordinary skill in the art that connector 48 may be designed in a variety of ways to accomplish the above-identified functions.

Figure 4:
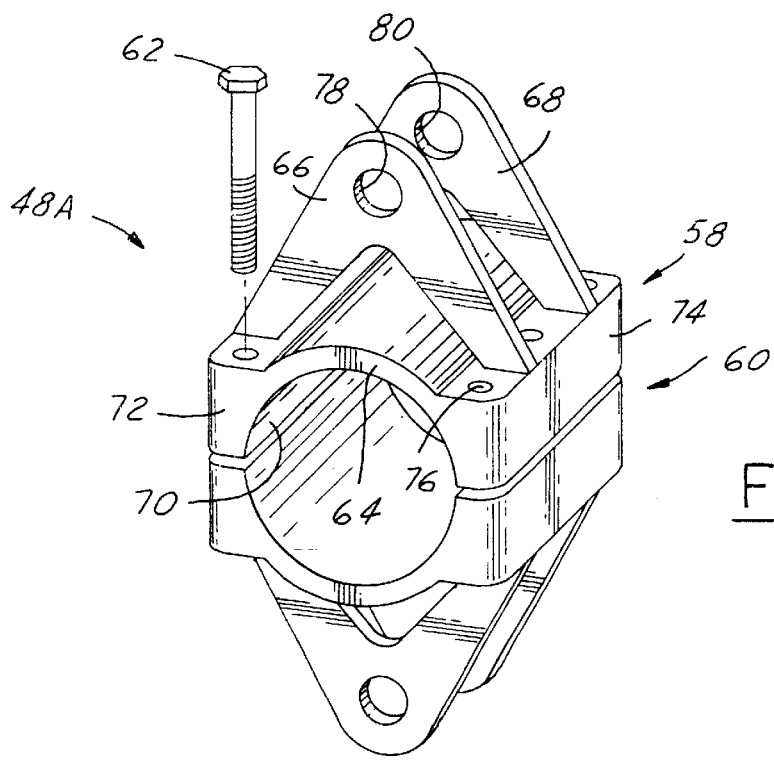
FIG. 4 is a perspective view of a first embodiment of a connector for the inventive suspension system.
Figure 5:
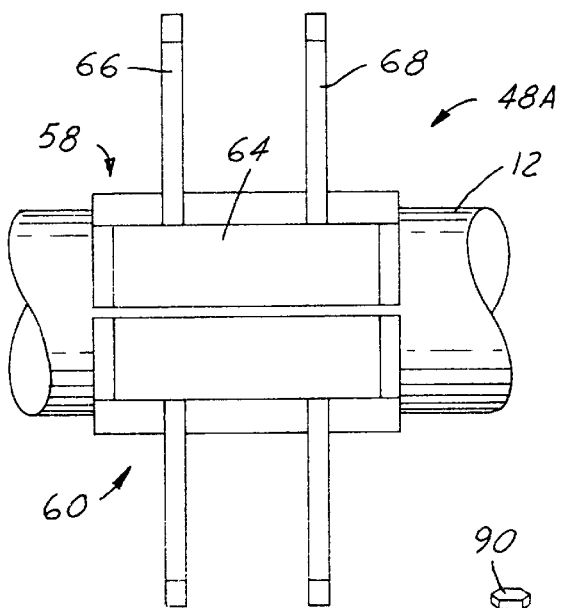
FIG. 5 is a side view of the connector of FIG. 4 disposed about a trailer axle.

Referring to FIGS. 4–5, a first embodiment of a connector 48A for use in the inventive suspension system will be described. Connector 48A includes first and second members 58, 60 disposed about first and second portions of one of trailer axles 12, 14 and a plurality of fasteners 62, only one of which is shown in the illustrated embodiment.

Members 58, 60 are provided to form a clamp about trailer axle 12 and to provide a mounting area for arms 50, 52 of suspension system 16. Members 58, 60 may be made from a variety of conventional metals and metal alloys and may be identical in shape and construction. Each of members 58, 60 includes a body portion 64 and a pair of brackets 66, 68.

Body portion 64 defines a semi-circular channel 70 configured to receive a portion of axle 12. It should be understood, however, that the shape of channel 70 may vary in accordance with the shape of axle 12. Referring to FIG. 5, channels 70 of members 58, 60 may be sized such that member 58 is spaced from member 60 about axle 12. Body portion 64 also defines a pair of flanges 72, 74 extending outwardly from body portion 64. Each of flanges 72, 74 defines a plurality of bores 76 extending in a direction perpendicular to the longitudinal axis of axle 12. Bores 76 are configured to receive fasteners 62 to couple members 58, 60 together.

Brackets 66, 68 are provided to receive upper and lower arms 50, 52 of suspension system 16. Brackets 66, 68 may be integral with body portion 64 or welded or otherwise connected to body portion 64. Each of brackets 66, 68 has a first end coupled to flange 72 of body portion 64 and a second end coupled to flange 74 of body portion 64. The apexes of brackets 66, 68 defines a pair of aligned apertures 78, 80 configured to receive a mounting pin (not shown).

Fasteners 62 are provided to coupled members 58, 60 together and secure connector 48A to axle 12. Fasteners 62 are conventional in the art and may comprise screws, bolts, or other conventional fastening means.

Figure 6:
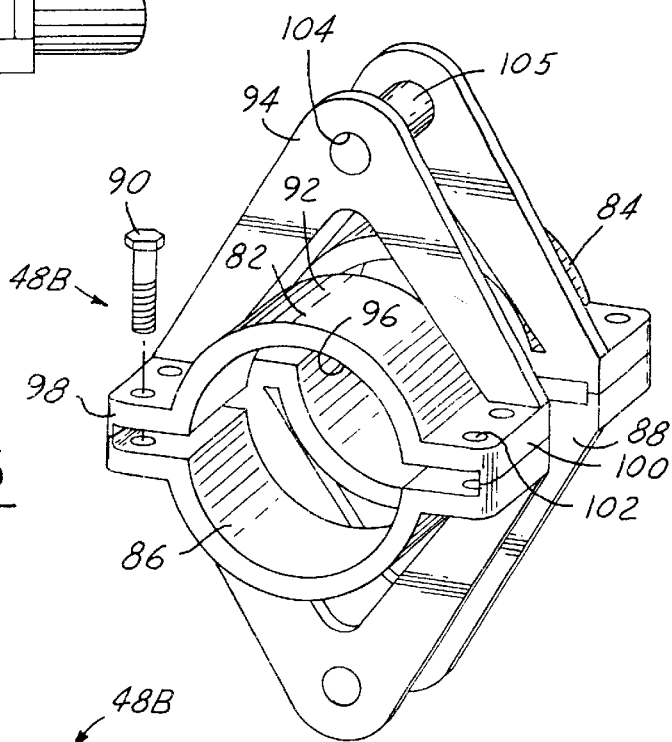
FIG. 6 is a perspective view of a second embodiment of a connector for the inventive suspension system.
Figure 7:
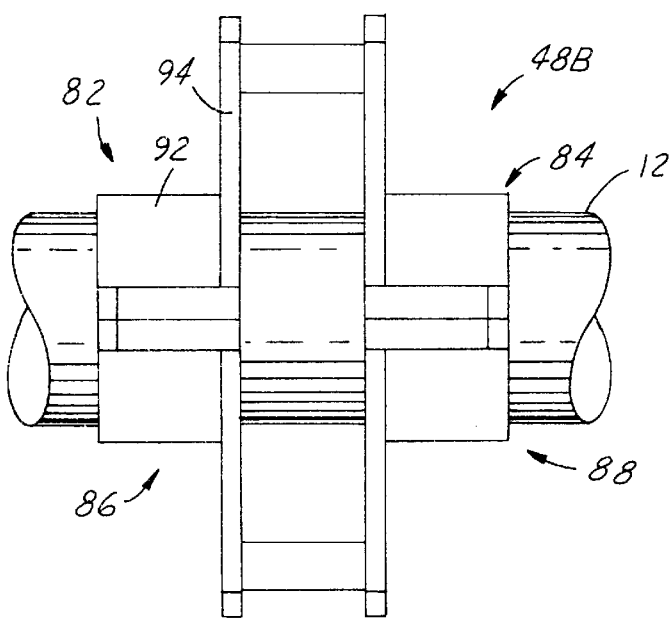
FIG. 7 is a side view of the connector of FIG. 6 disposed about a trailer axle.

Referring now to FIGS. 6–7, a second embodiment of a connector 48B for use in the inventive suspension system will be described. Connector 48B includes first, second, third, and fourth members 82, 84, 86, 88 disposed about portions of one of trailer axles 12, 14 and a plurality of fasteners 90, only one of which is shown in the illustrated embodiment.

Members 82, 84, 86, 88 are provided to form a pair of clamps about trailer axle 12 and to provide a mounting area for arms 50, 52 of suspension system 16. Members 82, 84, 86, 88 may be made from a variety of conventional metals and metal alloys and may be identical in shape and construction. Each of members 82, 84, 86, 88 includes a body portion 92 and a mounting bracket 94.

Body portion 92 defines a semi-circular channel 96 configured to receive a portion of axle 12. It should be understood, however, that the shape of channel 96 may vary in accordance with the shape of axle 12. Referring to FIG. 7, channels 96 of members 82, 84, 86, 88 may be sized such that members 82, 86 are in contact with members 84, 88, respectively, and completely surround axle 12. Body portion 92 also defines a pair of flanges 98, 100 extending outwardly from body portion 92. Each of flanges 98, 100 defines a plurality of bores 102 extending in a direction perpendicular to the longitudinal axis of axle 12. Bores 102 are configured to receive fasteners 90 to couple members 82, 86 together with members 84, 88, respectively.

The brackets 94 on opposing members (e.g., members 82, 86) are provided to receive upper and lower arms 50, 52 of suspension system 16. Brackets 94 may be integral with body portion 92 or welded or otherwise connected to body portion 92. Each of brackets 94 has a first end coupled to flange 98 of body portion 92 and a second end coupled to flange 100 of body portion 92. The apex of each bracket 94 defines an aperture 104 configured to receive a mounting pin 105.

Fasteners 90 are provided to couple members 82, 84, 86, 88 together and to secure connector 48B to axle 12. Fasteners 90 are conventional in the art and may comprise screws, bolts, or other conventional fastening means.

The use of connectors 48A or 48B within the inventive suspension system represents a significant advantage over the prior art. Conventional connectors are directly secured to the trailer axle by welding or an adhesive. Each of these connectors, therefore, requires a relatively large amount of assembly time and may weaken the axle. The disclosed connectors 48A, 48B, are securely mounted to the trailer axles 12, 14 without requiring contact between the fastener and the axle housing.

Referring again to FIGS. 1–3, upper and lower arms 50, 52 form a Watt's linkage and are provided to minimize and/or eliminate movement in the fore-aft direction (i.e., in the direction of vehicle travel perpendicular to the longitudinal direction of axles 12, 14) while allowing vertical displacement of axles 12, 14. Upper arm 50 has a first end pivotally coupled to frame 10-and particularly to hanger 32 of frame 10-and a second end coupled to connector 48. Lower arm 52 has a first end pivotally coupled to frame 10-and particularly to hanger 34-and a second end coupled to connector 48. Upper arm 50 is coupled to connector 48 at a point between frame 10 and axle 12-and particularly between rail 24 of frame 10 and axle 12 Lower arm 52 is coupled to connector 48 at a point between axle 12 and ground.

Referring to FIG. 1, the relationship of upper and lower arms 50, 52 may be described with reference to a pair of planes 106, 108 intersecting the longitudinal axis of axle 12. Plane 106 is parallel to rails 24, 26 of frame 10 (and the direction of vehicle travel) while plane 108 is perpendicular to rails 24, 26 of frame 10 (and the direction of vehicle travel). Upper arm 50 is coupled to connector 48 on a first (upper) side of plane 106 while lower arm 52 is coupled to connector 48 on a second (lower) side of plane 106. Upper arm 50 is coupled to frame 10 on a first side of plane 108 while lower arm 52 is coupled to frame 10 on a second side of plane 108.

Springs 54 are provided to maintain the vertical displacement of the trailer (not shown) relative to ground. Springs 54 are conventional in the art and may comprise air springs. Springs 54 may be located on spring seats formed by connectors 48 or by separate brackets mounted to axles 12, 14.

Panhard rods 56 restrict lateral movement of axles 12, 14 (i.e., movement in a direction perpendicular to vehicle travel) and are conventional in the art. Referring to FIG. 3, each of rods 56 may be mounted at a first end to a mounting bracket 110 descending from one of cross-members 28, 30 and at a second end to one of connectors 48.

Figure 8:
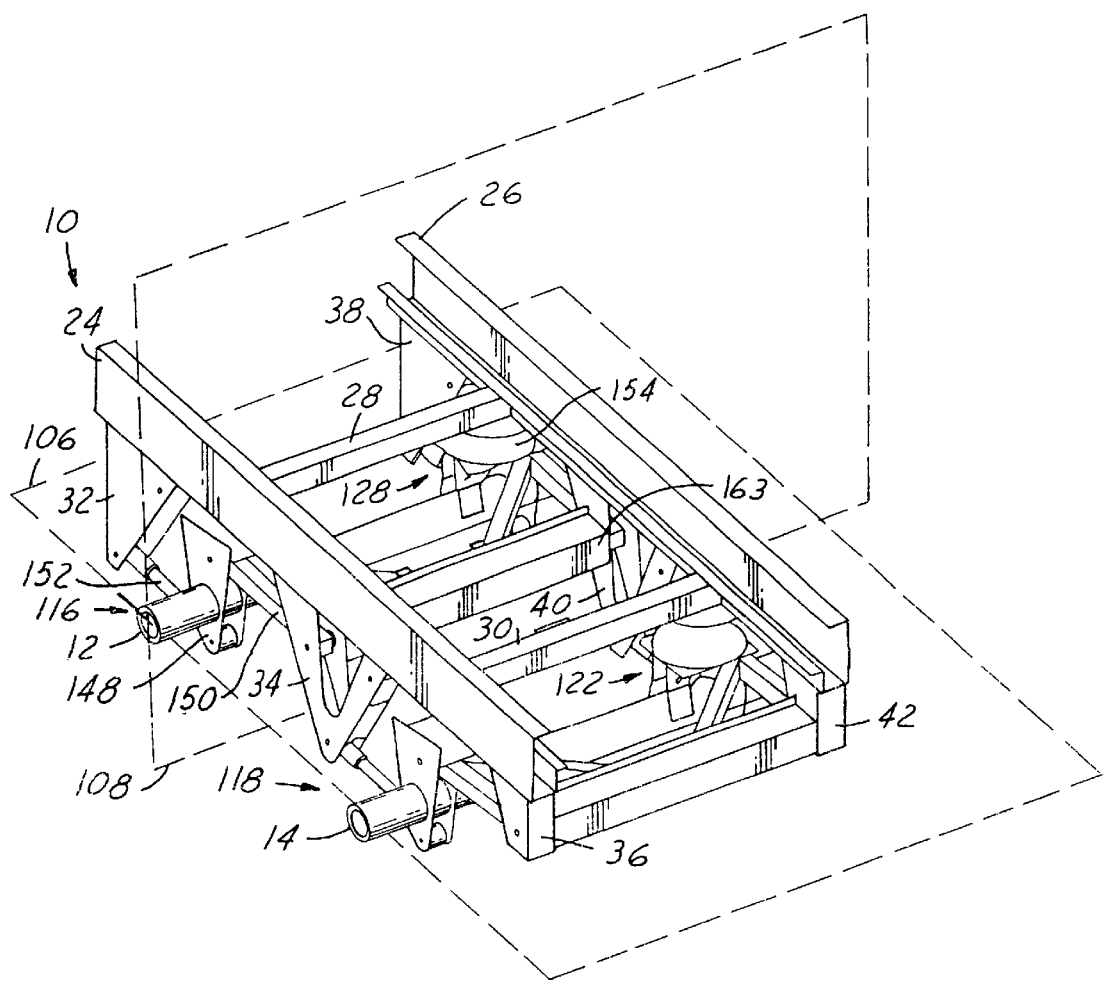
FIGS. 8–9 are perspective views of a trailer frame supported on a pair of trailer axles by a plurality of suspension systems in accordance with a second embodiment of the present invention.
Figure 9:
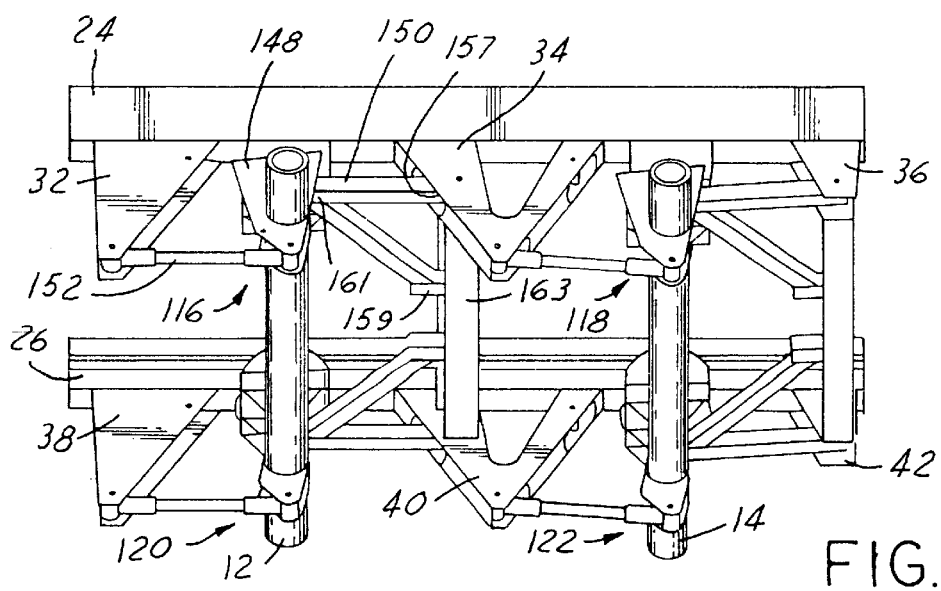

Referring now to FIGS. 8–9, a second embodiment of the inventive suspension system will be described. As illustrated in FIGS. 8–9, trailer frame 10 may be supported on trailer axles 12, 14 by a plurality of suspension systems 116, 118, 120, 122 in accordance with a second embodiment of the present invention. Suspension systems 116, 118, 120, 122 are provided to support frame 10 on axles 12, 14 and each system may include a connector 148, an upper arm 150, and a lower arm 152. Each of systems 116, 118, 120, 122 may also include an air spring 154. Connector 148, lower arm 152 and air spring 154 may be identical or substantially similar to connector 48, arm 52, and spring 54 described hereinabove. In the illustrated embodiment, however, upper arm 150 comprises a bifurcated control arm (or "A-arm")

Upper arm 150, together with lower arm 152, form a Watt's linkage and are provided to minimize and/or eliminate movement in the fore-aft direction (i.e., in the direction of vehicle travel perpendicular to the longitudinal axis of axles 12, 14) while allowing vertical displacement of axles 12, 14. Upper arm 150 also is provided to restrict lateral movement of axles 12, 14 (i.e., movement in a direction perpendicular to vehicle travel). Finally, upper arm 150 may form a spring seat for air spring 154. Upper arm 150 has first and second ends 157, 159 coupled to frame 10 and an apex 161 coupled to connector 148. In the illustrated embodiment, end 157 of arm 150 is coupled to hanger 34 of frame 10 while end 159 of arm 150 is coupled to a cross member 163 of frame 10. It will be understood by those of skill in the art, however, that arm 150 may be connected to frame 10 in a variety of ways.

A suspension system in accordance with the present invention represents a significant improvement over the prior art. The inventive suspension system minimizes and/or eliminates movement of the trailer axles 12, 14 in the fore-aft direction (i.e., in the direction of vehicle travel perpendicular to the longitudinal axis of axles 12, 14). As a result, the stress placed on axles 12, 14, and on the welded connections on the axles 12, 14 is reduced thereby prolonging the life of axles 12, 14 and reducing maintenance and repair costs.

While the invention has been particularly shown and described with reference to the preferred embodiments thereof, it is well understood by those skilled in the art that various changes and modifications can be made in the invention without departing from the spirit and scope of the invention.

We claim:

1. A suspension system for supporting a trailer frame on a non-driven trailer axle, comprising:
    a first connector disposed about said non-driven trailer axle;
    a first upper arm coupled to said frame and to said first connector at a point between said frame and said non-driven trailer axle;
    a first lower arm coupled to said frame and to said first connector at a point between said non-driven trailer axle and ground;
    a second connector disposed about said non-driven trailer axle;
    a second upper arm coupled to said frame and to said second connector at a point between said frame and said non-driven trailer axle; and,
    a second lower arm coupled to said frame and to said second connector at a point between said non-driven trailer axle and ground.

2. The suspension system of claim 1 wherein said first upper arm comprises a bifurcated control arm having first and second ends coupled to said frame and an apex coupled to said first connector.

3. A suspension system for supporting a trailer frame on a non-driven trailer axle, comprising:
    a connector disposed about said non-driven trailer axle;
    an upper arm coupled to said frame and to said connector at a point between said frame and said non-driven trailer axle;
    a lower arm coupled to said frame and to said connector at a point between said non-driven trailer axle and ground; and,
    a panhard rod having a first end coupled to said frame and a second end coupled to said connector.

4. The suspension system of claim 1 wherein said first connector includes:
    a first member disposed about a first portion of said non-driven trailer axle;
    a second member disposed about a second portion of said non-driven trailer axle; and,
    a fastener connecting said first and second members.

5. The suspension system of claim 4 wherein said first and second members are identically shaped.

6. The suspension system of claim 4 wherein said first member includes:
    a body portion defining a channel sized to receive said non-driven trailer axle; and,
    a bracket mounted to said body portion, said bracket configured to receive one of said first upper arm and said first lower arm.

7. The suspension system of claim 4 wherein said first and second members surround said non-driven trailer axle.

8. A suspension system for supporting a trailer frame on first and second non-driven trailer axles, comprising:
- a first connector disposed about said first non-driven trailer axle;
- a first upper arm coupled to said frame and to said first connector at a point between said frame and said first non-driven trailer axle;
- a first lower arm coupled to said frame and to said first connector at a point between said first non-driven trailer axle and ground;
- a second connector disposed about said first non-driven trailer axle;
- a second upper arm coupled to said frame and to said second connector at point between said frame and said first non-driven trailer axle;
- a second lower arm coupled to said frame and to said second connector at a point between said first non-driven trailer axle and ground
- a third connector disposed about said second non-driven trailer axle;
- a third upper arm coupled to said frame and to said third connector at a point between said frame and said second non-driven trailer axle;
- a third lower arm coupled to said frame and to said third connector at a point between said second non-driven trailer axle and ground;
- a fourth connector disposed about said second non-driven trailer axle;
- a fourth upper arm coupled to said frame and to said fourth connector at a point between said frame and said second non-driven trailer axle;
- a fourth lower arm coupled to said frame and to said fourth connector at a point between said second non-driven trailer axle and ground.

9. The suspension system of claim 8 wherein said first upper arm comprises a bifurcated control arm having first and second ends coupled to said frame and an apex coupled to said first connector.

10. A suspension system for supporting a trailer frame on first and second non-driven trailer axles, comprising:
- a first connector disposed about said first non-driven trailer axle;
- a first upper arm coupled to said frame and to said first connector at a point between said frame and said first non-driven trailer axle;
- a first lower arm coupled to said frame and to said first connector at a point between said first non-driven trailer axle and ground;
- a second connector disposed about said second non-driven trailer axle;
- a second upper arm coupled to said frame and to said second connector at a point between said frame and said second non-driven trailer axle;
- a second lower arm coupled to said frame and to said second connector at a point between said second non-driven trailer axle and ground; and,
- a panhard rod having a first end coupled to said frame and a second end coupled to said first connector.

11. The suspension system of claim 8 wherein said first connector includes:
- a first member disposed about a first portion of said first non-driven trailer axle;
- a second member disposed about a second portion of said first non-driven trailer axle; and,
- a fastener connecting said first and second members.

12. The suspension system of claim 11 wherein said first and second members are identically shaped.

13. The suspension system of claim 11 wherein said first member includes:
- a body portion defining a channel sized to receive said first non-driven trailer axle; and,
- a bracket mounted to said body portion, said bracket configured to receive one of said first upper arm and said first lower arm.

14. The suspension system of claim 11 wherein said first and second members surround said first non-driven trailer axle.

15. A suspension system for supporting a trailer frame on a non-driven trailer axle, said trailer frame including first and second longitudinal rails extending transversely relative to said non-driven trailer axle and said non-driven trailer axle disposed about an axis and divided by a first plane extending through said axis and parallel to said first and second longitudinal rails and a second plane extending through said axis and perpendicular to said first and second longitudinal rails, said suspension system comprising:
- a first connector disposed about said non-driven trailer axle;
- a first upper arm coupled to said frame on a first side of said second plane and to said first connector on a first side of said first plane;
- a first lower arm coupled to said frame on a second side of said second plane and to said first connector on a second side of said first plane
- a second connector disposed about said non-driven trailer axle;
- a second upper arm coupled to said frame on a first side of said second plane and to said second connector on a first side of said first plane; and,
- a second lower arm coupled to said frame on a second side of said second plane and to said second connector on a second side of said first plane.

16. The suspension system of claim 15 wherein said first upper arm comprises a bifurcated control arm having first and second ends coupled to said frame and an apex coupled to said first connector.

17. A suspension system for supporting a trailer frame on a non-driven trailer axle, said trailer frame including a longitudinal rail extending transversely relative to said non-driven trailer axle and said non-driven trailer axle disposed about an axis and divided by a first plane extending through said axis and parallel to said longitudinal rail and a second plane extending through said axis and perpendicular to said longitudinal rail, said suspension system comprising:
- a connector disposed about said non-driven trailer axle;
- an upper arm coupled to said frame on a first side of said second plane and to said connector on a first side of said first plane;
- a lower arm coupled to said frame on a second side of said second plane and to said connector on a second side of said first plane; and,
- a panhard rod having a first end coupled to said frame and a second end coupled to said connector.

18. The suspension system of claim 15 wherein said first connector includes:

a first member disposed about a first portion of said non-driven trailer axle;

a second member disposed about a second portion of said non-driven trailer axle; and, a fastener connecting said first and second members.

19. The suspension system of claim 18 wherein said first and second members are identically shaped.

20. The suspension system of claim 18 wherein said first member includes:

a body portion defining a channel sized to receive said non-driven trailer axle; and, a bracket mounted to said body portion, said bracket configured to receive one of said first upper arm and said first lower arm.

21. The suspension system of claim 1 wherein said first upper arm and said first lower arm are parallel to a longitudinal rail of said trailer frame.

22. The suspension system of claim 8 wherein said first upper arm and said first lower arm are parallel to a longitudinal rail of said trailer frame.

23. The suspension system of claim 15 wherein said first upper arm and said first lower arm are parallel to said first longitudinal rail of said trailer frame.

* * * * *